United States Patent
R (10) Patent No.: US 12,510,905 B1
(45) Date of Patent: Dec. 30, 2025

(54) DYNAMIC SCAN DIRECTION CONTROL OF AN AUTOMATED GUIDED VEHICLE BASED ON BARCODE INFORMATION

(71) Applicant: E-CON SYSTEMS INDIA PRIVATE LIMITED, Chennai (IN)

(72) Inventor: Vigneshkumar R, Chennai (IN)

(73) Assignee: E-CON SYSTEMS INDIA PRIVATE LIMITED (IN)

( * ) Notice: Subject to any disclaimer, the term of this patent is extended or adjusted under 35 U.S.C. 154(b) by 16 days.

(21) Appl. No.: 18/808,481

(22) Filed: Aug. 19, 2024

(51) Int. Cl.
| | |
|---|---|
| *B25J 9/02* | (2006.01) |
| *G05D 1/244* | (2024.01) |
| *G06K 7/14* | (2006.01) |
| *G06K 19/06* | (2006.01) |
| *G05D 107/70* | (2024.01) |

(52) U.S. Cl.
CPC ......... *G05D 1/2446* (2024.01); *G06K 7/1456* (2013.01); *G06K 19/06037* (2013.01); *G06K 19/06093* (2013.01); *G05D 2107/70* (2024.01)

(58) Field of Classification Search
CPC ............. G05D 1/2446; G05D 2107/70; G06K 7/1456; G06K 19/06037; G06K 19/06093
See application file for complete search history.

(56) References Cited

U.S. PATENT DOCUMENTS

| | | | |
|---|---|---|---|
| 8,733,649 B2 | 5/2014 | Cai et al. | |
| 9,726,750 B2 * | 8/2017 | Gross | ...................... G06F 30/13 |
| 10,146,971 B1 * | 12/2018 | Cansizoglu | ........ G06K 7/10722 |
| 2015/0302236 A1 | 10/2015 | Aspert et al. | |
| 2017/0173262 A1 * | 6/2017 | Veltz | ...................... G16H 20/17 |
| 2018/0288037 A1 * | 10/2018 | Yang | ........................ G06F 21/35 |
| 2019/0180067 A1 * | 6/2019 | Sun | ....................... G06K 7/1417 |
| 2019/0377356 A1 | 12/2019 | Fischer et al. | |
| 2025/0263233 A1 * | 8/2025 | Shultz | .................. G06Q 10/087 |

FOREIGN PATENT DOCUMENTS

CN 113050612 A 6/2021

* cited by examiner

*Primary Examiner* — Dalena Tran
(74) *Attorney, Agent, or Firm* — Jason C. Cameron (57) ABSTRACT

A system for dynamic scan direction control of an automated guided vehicle based on barcode information is provided. The system includes a processing module to identify a position of a data matrix symbol of a first barcode and identify solid sides with minimum number of transitions. The processing module optimizes the identification of the second solid side. The processing module confirms the first solid side of the first barcode and consecutive barcodes based on factors. The system includes a data matrix orientation module to fix a scanning direction for the consecutive data matrix barcodes based on the identified orientation of the first barcode for reducing runtime required for identifying orientation of the first and second solid side. The system includes a scanning direction module to adjust the scanning direction based on AGV movements in real-time. The scanning process is updated based on the movement of the AGV.

13 Claims, 6 Drawing Sheets

DYNAMIC SCAN DIRECTION CONTROL OF AN AUTOMATED GUIDED VEHICLE BASED ON BARCODE INFORMATION

FIELD OF INVENTION

Embodiments of a present disclosure relate to a technical field of automated guided vehicles and more particularly to a system and method for dynamic scan direction control of an automated guided vehicle based on barcode information.

BACKGROUND

Automated guided vehicles (AGV) (also called as 'driverless cars') is a mobile robotic vehicle used in industrial applications to transport materials around an environment for instance, a manufacturing facility or a warehouse. Currently, AGV is a key component of modern automated logistics and manufacturing systems. They are designed to move automatically following predefined paths or responding to navigation systems. The navigation system is critical for its ability to move automatedly within the environment. The successful design and deployment of AGV requires finding an optimal path from the AGV's current location to a specified destination.

Currently, several technologies are used for the navigation system. The choice of the technology depends on the specific requirements of the application, the environment, and the desired level of flexibility and accuracy. Each technology has its own advantages and limitations, making it essential to evaluate them based on the operational needs of the facility. One such technology involves the use of a bar guidance that are placed on the floors to create a predefined path for the AGV.

However, there is a notable need for optimizing barcode scanning efficiency and decision-making speed during the navigation. Existing solutions lack a dynamic approach to adjust the scan direction swiftly in alignment with changes in the AGV's course. This limitation can slow down decoding speed and hinder the AGV's ability to make timely decisions, impacting overall operational efficiency.

While barcode scanning is a valuable tool for AGV navigation, its limitations in scanning efficiency and decision-making speed can significantly impact overall operational efficiency. Optimizing these aspects is crucial for improving the performance of AGVs in dynamic and complex environments, ensuring that they can navigate accurately and respond swiftly to changes.

Hence, there is a need for a system and a method for a dynamic scan direction control of an automated guided vehicle based on barcode information which addresses the aforementioned issues.

BRIEF DESCRIPTION

In accordance with another embodiment, a system for dynamic scan direction control of an automated guided vehicle based on barcode information is disclosed. The system includes a plurality of barcode strips disposed on a flat surface, wherein the plurality of barcode strips comprises a plurality of data matrix barcodes with a predetermined pattern. The system also includes a hardware processor. The system includes a memory operatively coupled to the hardware processor and the plurality of barcode strips. The memory comprises a set of instructions in the form of a processing subsystem, configured to be executed by the hardware processor. The processing subsystem is configured to execute on a network to control bidirectional communications among a plurality of modules. The plurality of modules includes a processing module, a data matrix orientation module and a scanning direction module. The processing module is configured to identify a position of a data matrix symbol embedded in an image of a first barcode through a symbol localization technique via a camera attached at a bottom portion of an automated guided vehicle. The processing module is configured to identify a plurality of solid sides of the data matrix symbol to define a rectangular area that accommodates the first barcode, wherein the plurality of solid sides of the data matrix are identified with a minimum number of transitions. Further, the processing module is configured to scan the first barcode to detect all directions to ascertain the pattern of the barcode on a surface, wherein the scanning is performed upon initialization of the automated guided vehicle positioned in an orientation on the surface, without a predetermined orientation of the barcode pattern affixed to the surface. Furthermore, the processing module is configured to assume and streamline the identification of the data matrix barcode, wherein the data matrix barcode is predetermined for optimizing the identification of the second solid side of the data matrix barcode. Moreover, the processing module is configured to confirm the identified first solid side of the first barcode and consecutive barcodes based on a plurality of factors. The data matrix orientation module is operatively coupled with a processing module and configured to fix a scanning direction of the automated guided vehicle for the consecutive data matrix barcodes based on the identified orientation of the first barcode for reducing runtime of the processing module required for identifying orientation of the first solid side and the second solid side. The scanning direction module is operatively coupled with the data matrix orientation module and configured to adjust the scanning direction based on automated guided vehicle movements in real-time. The scanning direction module is also configured to update scanning process based on the movement of the automated guided vehicle.

In accordance with one embodiment of the disclosure a method for dynamic scan direction control of an automated guided vehicle based on barcode information is disclosed. The method includes identifying, by a processing module of a processing subsystem, a position of a data matrix symbol embedded in an image of a first barcode through a symbol localization technique via a camera attached at a bottom portion of an automated guided vehicle. The method includes identifying, by the processing module of the processing subsystem, a plurality of solid sides of the data matrix symbol to define a rectangular area that accommodates the first barcode, wherein the plurality of solid sides of the data matrix are identified with a minimum number of transitions. The method includes scanning, by the processing module of the processing subsystem, the first barcode to detect all directions to ascertain the pattern of the barcode on a surface, wherein the scanning is performed upon initialization of the automated guided vehicle positioned in an orientation on the surface, without a predetermined orientation of the barcode pattern affixed to the surface. The method includes assuming and streamlining, by the processing module of the processing subsystem, the identification of the data matrix barcode, wherein the data matrix barcode is predetermined for optimizing the identification of the second solid side of the data matrix barcode. The method includes confirming, by the processing module of the processing subsystem, the identified first solid side of the first barcode and consecutive barcodes based on a plurality of factors.

Further, the method includes fixing, by a data matrix orientation module of the processing subsystem, a scanning direction of the automated guided vehicle for the consecutive data matrix barcodes based on the identified orientation of the first barcode for reducing runtime of the processing module required for identifying orientation of the first solid side and the second solid side. Furthermore, the method includes adjusting, by a scanning direction module of the processing subsystem, the scanning direction based on automated guided vehicle movements in real-time. Moreover, the method includes updating, by the scanning direction module of the processing subsystem, scanning process based on the movement of the automated guided vehicle.

In accordance with another embodiment of the present disclosure, a non-transitory computer-readable medium storing a computer program that, when executed by a processor, causes the processor to perform a computer-implemented method for dynamic scan direction control of an automated guided vehicle based on barcode information is provided. The method includes identifying, by a processing module of a processing subsystem, a position of a data matrix symbol embedded in an image of a first barcode through a symbol localization technique via a camera attached at a bottom portion of an automated guided vehicle. The method includes identifying, by the processing module of the processing subsystem, a plurality of solid sides of the data matrix symbol to define a rectangular area that accommodates the first barcode, wherein the plurality of solid sides of the data matrix are identified with a minimum number of transitions. The method includes scanning, by the processing module of the processing subsystem, the first barcode to detect all directions to ascertain the pattern of the barcode on a surface, wherein the scanning is performed upon initialization of the automated guided vehicle positioned in an orientation on the surface, without a predetermined orientation of the barcode pattern affixed to the surface. The method includes assuming and streamlining, by the processing module of the processing subsystem, the identification of the data matrix barcode, wherein the data matrix barcode is predetermined for optimizing the identification of the second solid side of the data matrix barcode. The method includes confirming, by the processing module of the processing subsystem, the identified first solid side of the first barcode and consecutive barcodes based on a plurality of factors. Further, the method includes fixing, by a data matrix orientation module of the processing subsystem, a scanning direction of the automated guided vehicle for the consecutive data matrix barcodes based on the identified orientation of the first barcode for reducing runtime of the processing module required for identifying orientation of the first solid side and the second solid side. Furthermore, the method includes adjusting, by a scanning direction module of the processing subsystem, the scanning direction based on automated guided vehicle movements in real-time. Moreover, the method includes updating, by the scanning direction module of the processing subsystem, scanning process based on the movement of the automated guided vehicle.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the system, one or more components of the system may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for dynamic scan direction control of an automated guided vehicle based on barcode information is disclosed. The system includes a plurality of barcode strips disposed on a flat surface, wherein the plurality of barcode strips comprises a plurality of data matrix barcodes with a predetermined pattern. The system also includes a hardware processor. The system includes a memory operatively coupled to the hardware processor and the plurality of barcode strips. The memory comprises a set of instructions in the form of a processing subsystem, configured to be executed by the hardware processor. The processing subsystem is configured to execute on a network to control bidirectional communications among a plurality of modules. The plurality of modules include a processing module, a data matrix orientation module and a scanning direction module. The processing module is configured to identify a position of a data matrix symbol embedded in an image of a first barcode through a symbol localization technique via a camera attached at a bottom portion of an automated guided vehicle. The processing module is configured to identify a plurality of solid sides of the data matrix symbol to define a rectangular area that accommodates the first barcode, wherein the plurality of solid sides of the data matrix are identified with a minimum number of transitions. Further, the processing module is configured to scan the first barcode to detect all directions to ascertain the pattern of the barcode on a surface, wherein the scanning is performed upon initialization of the automated guided vehicle positioned in an orientation on the surface, without a predetermined orientation of the barcode pattern affixed to the surface. Furthermore, the processing module is configured to assume and streamline the identification of the data matrix barcode, wherein the data matrix barcode is predetermined for optimizing the identification of the second solid side of the data matrix barcode. Moreover, the processing module is configured to confirm the identified first solid side of the first barcode and consecutive barcodes based on a plurality of factors. The data matrix orientation module is operatively coupled with a processing module and configured to fix a scanning direction of the automated guided vehicle for the consecutive data matrix barcodes based on the identified orientation of the first barcode for reducing runtime of the processing module required for identifying orientation of the first solid side and the second solid side. The scanning direction module is operatively coupled with the data matrix orientation module and configured to adjust the scanning direction based on automated guided vehicle movements in real-time. The scanning direction module is also configured to update scanning process based on the movement of the automated guided vehicle.

Figure 1:
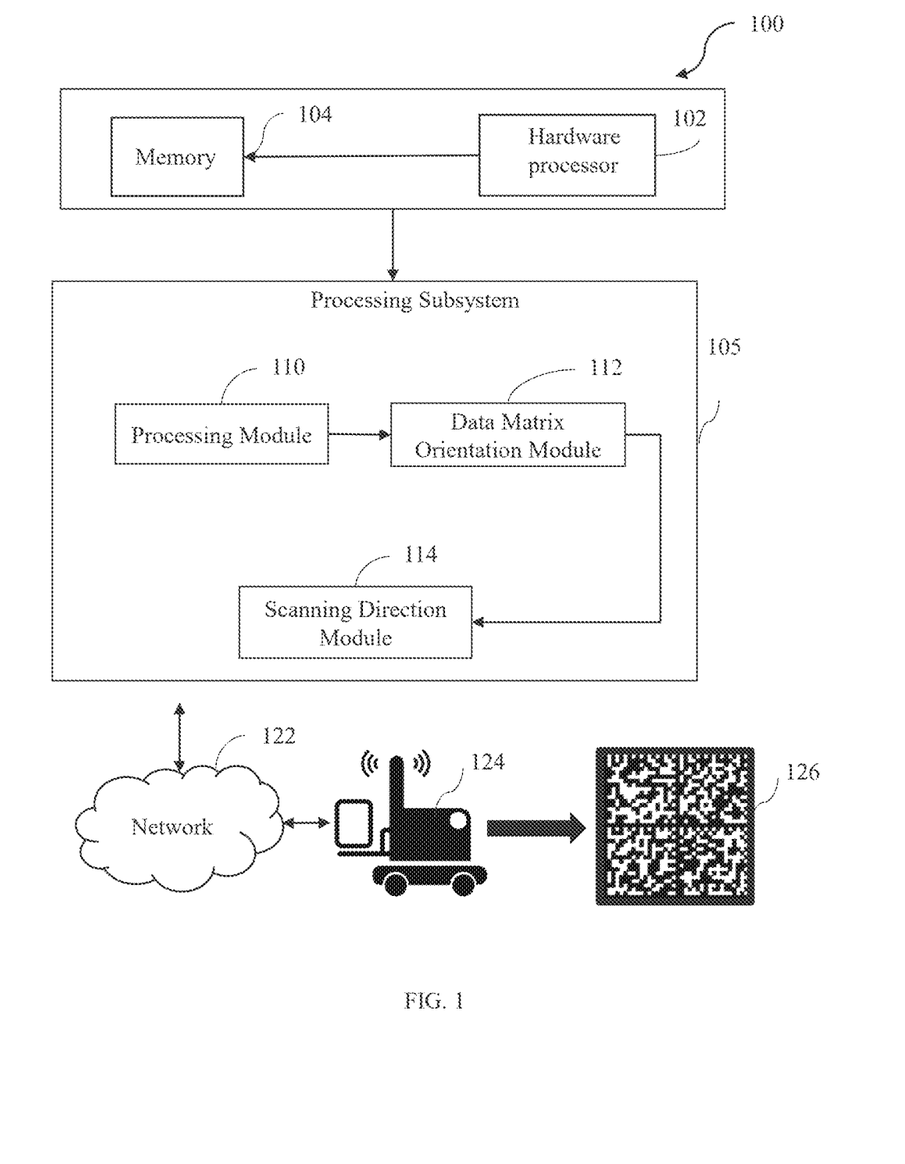
FIG. 1 is a block diagram of a system for dynamic scan direction control of an automated guided vehicle based on barcode information in accordance with an embodiment of the present disclosure.

FIG. 1 is a block diagram of a system 100 for dynamic scan direction control of an automated guided vehicle based on barcode information in accordance with an embodiment of the present disclosure. The automated guided vehicle (AGV) 124 is a mobile robot that uses a navigation technology to transport materials or goods within a defined environment without the need of a human operator. It must be noted that although there is one automated vehicle shown, multiple automated vehicles may be coupled to each other over a network 122.

The system 100 comprises a plurality of barcode strips disposed on a flat surface of the environment. The plurality of barcode strips comprises a plurality of data matrix barcodes 126 with a pre-determined pattern to provide positional and directional information to the AGV. In one embodiment, the plurality of barcode strips includes an event marker adapted to generate a plurality of control signals with respect to movement of the automated guided vehicle 124. Typically, a barcode scanner (not shown in FIG. 1) is mounted on the AGV to read the data matrix barcodes 126 on the plurality of barcode strips. The barcode scanner is operatively coupled to a camera (not shown in FIG. 1) mounted at the bottom of the AGV to capture images of the barcode strips on the flat surface to collect data about the AGV's environment. In one embodiment, the camera is configured with a decoding method to efficiently extract data. The decoding method aims to identify and interpret the information encoded in the data matrix barcode 126. In such an embodiment, the decoding method is designed to reduce the processing time and enhance the AGV navigation.

The system 100 includes a hardware processor 102 and a memory 104 coupled to the hardware processor 102. The memory 104 includes a set of program instructions in the form of a processing subsystem 105 and configured to be executed by the hardware processor 102. As used herein, the hardware processor performs data processing, decision making and all general computing tasks and coordinates tasks done by memory, disk storage and other system components. The processing subsystem 105 is configured to control bidirectional communications among a plurality of modules.

Further, the plurality of modules includes a processing module 110, a data matrix orientation module 112 and a scanning direction module 114.

The processing module 110 is configured to identify a position of a data matrix symbol embedded in an image of a first barcode through a symbol localization technique via the camera attached at a bottom portion of an automated guided vehicle. The processing module 110 uses the captured images to identify and decode the data matrix symbol. The symbol localization technique refers to the process of identifying and pinpointing the exact position of data matrix barcodes 126, within the image of the first barcode. Typically, symbol localization is essential for accurately interpreting the data encoded in barcodes that guide the AGV. Examples of the symbol localization techniques includes, but is not limited to, pattern matching, geometric transformation and feature extraction.

The processing module 110 identifies a plurality of solid sides of the data matrix symbol to define a rectangular area that accommodates the first barcode. The plurality of solid sides of the data matrix are identified with a minimum number of transitions. Particularly, a plurality of corners of the data matrix symbol are identified to define the rectangular area. The transitions are a plurality of changes between black and white modules in the barcode. In one embodiment, the processing module 110 is configured to calculate the number of transitions along each of the plurality of edges by analyzing pixel values stepwise to identify the solid side.

It will be appreciated to those skilled in the art that two adjacent sides of the data matrix symbol form an L-shaped solid border, often referred to as the 'Finder Pattern' or 'L Pattern'. The purpose of such solid sides is to provide orientation and timing information to locate and decode the data matrix symbol correctly.

Particularly, a first solid side and a second solid side is identified. The process to identify the first solid side begins with symbol localization as discussed earlier. Once the symbol is localized, the corners of the data matrix symbol is identified. The corners help to define a rectangular area containing the barcode. The edges formed by the detected corners are scanned to identify the minimum number of transitions. The side with the minimum number of transitions is identified as the first solid side of the data matrix symbol. Typically, transitions refer to changes between black and white modules in the first barcode. Further, the minimum number of transitions indicates a stable and distinguishable side. The number of transitions along each edge is calculated by analyzing the pixel values. In one embodiment, the analysis of the pixel values is performed by Bresenham's method. After identifying the first solid side, the decoding process involves locating the opposite or second solid side. This step is crucial for determining the correct orientation of the data matrix barcode 126.

Further, the processing module 110 is configured to scan the first barcode to detect all directions to ascertain the pattern of the barcode on a surface. The scanning is performed upon initialization of the automated guided vehicle 124 positioned in an orientation on the surface, without a predetermined orientation of the barcode pattern affixed to the surface. It must be noted that the processing module 110 is configured with a scanning barcode algorithm to scan the images captured by the camera. Typically, different directions are scanned and the side with minimal transitions is identified, ensuring accuracy in recognizing the second solid side. This approach is essential for achieving fast, robust and reliable decoding results through zebra crossing (ZXing) barcode scanning library.

Additionally, the processing module 110 assumes and streamlines the identification of the data matrix barcode 126, wherein the data matrix barcode 126 is predetermined for optimizing the identification of the second solid side of the data matrix barcode 126. The identified first solid side of the first barcode and consecutive barcodes is confirmed based on a plurality of factors. The plurality of factors comprises symmetry geometric properties of the data matrix.

The data matrix orientation module 112 is operatively coupled with the processing module 110. The data matrix orientation module 112 is configured to fix a scanning direction of the automated guided vehicle 124 for the consecutive data matrix barcodes 126 based on the identified orientation of the first barcode for reducing runtime of the processing module required for identifying orientation of the first solid side and the second solid side.

The scanning direction module 114 is operatively coupled to the data matrix orientation module 112 and is configured to adjust the scanning direction based on automated guided vehicle 124 movements in real-time. Further, the scanning direction module 114 is configured to update scanning process based on the movement of the automated guided vehicle 124. The direction of movement of the automated guided vehicle 124 is at least one of left and right.

In one embodiment, the scanning direction module 114 enables a barcode decoding algorithm to dynamically adjust the scanning direction for decoding the data matrix barcode 126 within the image captured by the camera.

Additionally, the scanning direction module 114 includes a dynamic control wherein the dynamic control is configured to ensure the automated guided vehicle 124 is scanning in the accurate direction, contributing to minimize barcode decoding and rapid decision-making of movement. The dynamic control is also configured to ensure that the processing subsystem running in the hardware processor is responsible for decoding the barcode captured by the camera and dynamically adjusts the scanning direction. Further, the dynamic control is configured to expedite the barcode decoding and allows a swift decision-making regarding the automated guided vehicle's 124 movement.

In one embodiment, the the scanning direction module 114 allows the automated guided vehicle 124 to turn for minimizing the decoding time for the automated guided vehicle 124.

Figure 2:
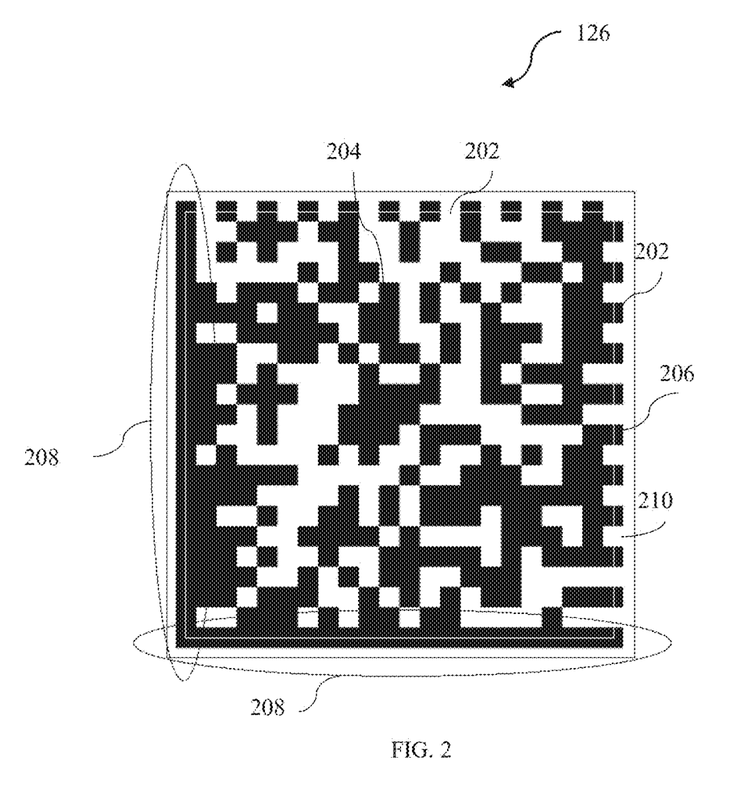
FIG. 2 is a schematic representation of an exemplary data matrix used for scanning of FIG. 1 in accordance with an embodiment of the resent disclosure.

FIG. 2 is a schematic representation of an exemplary data matrix used for scanning of FIG. 1 in accordance with an embodiment of the resent disclosure. The data matrix 126 is a 2D matrix code capable of encoding very large amounts of data in a compact space. Data Matrix codes are made up of small black and white squares that form a big square or rectangle. Typically, the data matrix code includes a clocking pattern 202, cell (or module) 204, data region 206, finder or 'L' pattern 208 and quiet zone 210.

The clocking pattern 202 provides a count of the number of rows and columns in the data matrix code 126. The cell 204 refers to the interior components of the code that make up the pattern. Further, the data region 206 can be text or numeric data up to 2,335 alphanumeric characters, redundant data is often included so even if one or more cells are damaged, the code is still readable. finder or 'L' pattern 208 helps the barcode scanner to locate and determine the orientation of the code. The quiet zone 210 is typically the white space margin around the entire data matrix code 126. The quiet zone 210 is critical for decoding the data matrix code 126 correctly.

Further, the data matrix code 126 includes a solid side 208. Typically, the solid side 208 is identified upon scanning to proceed further processing. It must be noted that the solid side 208 is also a part of the 'L' pattern 208.

Figure 3A:
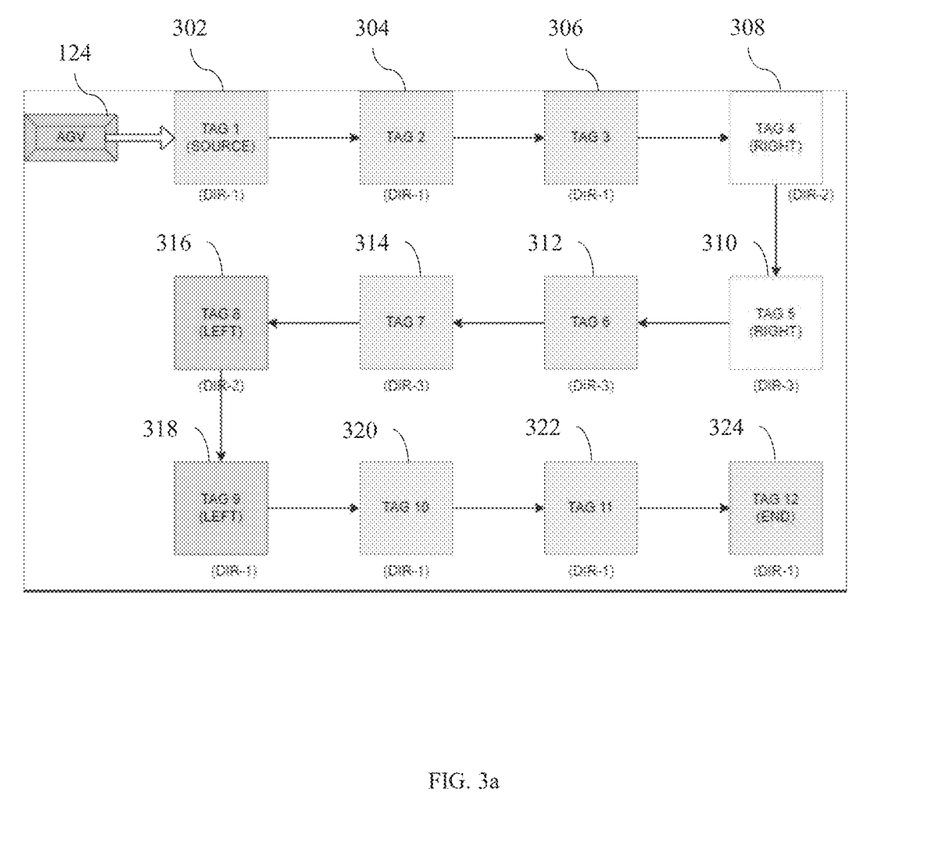
FIG. 3a and FIG. 3b are schematic representations demonstrating the AGV's scan direction shifting in response to changes in the AGV course of FIG. 1 in accordance with an embodiment of the present disclosure.
Figure 3B:
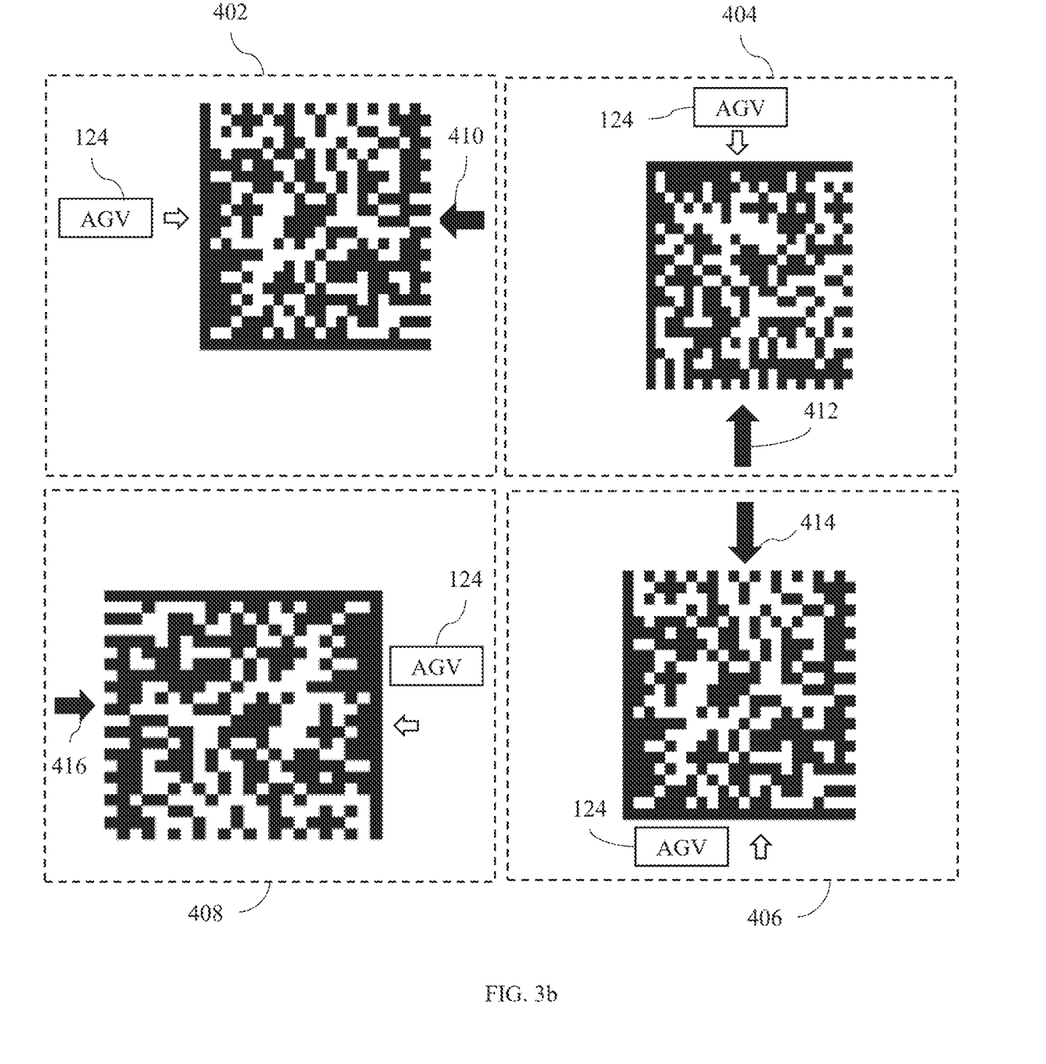

FIG. 3a and FIG. 3b are schematic representations demonstrating the AGV's scan direction shifting in response to changes in the AGV course of FIG. 1 in accordance with an embodiment of the present disclosure.

FIG. 3a is a schematic representation depicting the change in the AGV 124 course. Tag 1 302 represents the source barcode. Likewise, Tag 2 304, Tag 3 306, Tag 4 308, Tag 5 310, Tag 6 312, Tag 7 314, Tag 8 316, Tag 9 318, Tag 10 320, Tag 11 322 and Tag 12 324 represents subsequent barcodes that are scanned by the AGV 124. The Tag 12 324 represents the end of the barcodes.

To begin with, the AGV 124 scans Tag 1 302 and identifies the barcode with a straight direction (DIR-1). Subsequently, Tag 2 304 and Tag 3 306 are scanned and are identified as a straight direction (DIR-1). Subsequently, when Tag 4 308 is scanned, a right direction (DIR-2) is identified and the AGV 124 turns accordingly. It must be noted that since the direction of the AFV 124 shifts, the direction is denoted as 'DIR-2'. Tag 5 310 is also identified as a right turn, therefore the AGV 124 makes a right turn again and is denoted as 'DIR-3'. Tag 6 312 and Tag 7 314 are identified as a straight direction. As the direction of the AGV 124 remains the same, the direction is denoted as 'DIR-3'. However, when Tag 8 316 is scanned, the direction is identified as a left turn. At this point, the AGV 124 turns to the left direction. Tag 9 318 is also identified as a left direction and the AGV 124 turns to the left direction again. Subsequently, Tag 10 320, Tag 11 322 and Tag 12 324 are identified as a straight direction and hence the AGV 124 travels to reach the end of the course.

FIG. 3b is a schematic representation depicting the AGV direction and scan direction simultaneously. Typically, just as the AGV direction changes, the scan direction also shifts. At the first instance 402, AGV direction 124 is illustrated with the scan direction 410. The scan direction 410 starts from the right direction. Now when the AGV direction 124 shifts to a 90 degree rotation in 404, the scan direction 412 also shifts. The scan direction 412 starts from the bottom direction. Likewise, when the AGV direction 124 shifts to a 270 degree rotation in 406, the scan direction 414 also shifts. The scan direction 414 starts from the top direction. The same shifting process can be seen in 408, wherein the AGV direction 124 shifts to a 180 degree rotation and causes the scan direction 416 to also shift. The scan direction 416 starts from the left side of the image. In this way, decoding speed is enhanced, and rapid decision-making is enabled for efficient operations.

Consider a non-limited example wherein an AGV is utilized in an e-commerce fulfilment centre to transport goods from a receiving area A to a destination storage B within the warehouse. At the receiving area A, workers place a plurality of boxes onto the AGV for transportation. A plurality of barcode strips are disposed on a flat surface between the receiving area A to the destination storage B. The plurality of barcode strips includes a plurality of data matrix barcodes with a pre-determined pattern. The orientation of the data matrix is fixed on the floor, providing control over orientation. A camera attached to the bottom portion of the AGV captures and decodes the data matrix barcodes in order to navigate from the receiving area A to the destination storage B. This is typically performed by a symbol localization technique. During the decoding process, a first solid side is identified which is then used for subsequent decoding steps. Different directions of the data matrix barcodes are scanned to identify the side with minimal transitions to identify a second solid side. The second solid side is then identified thereby determining the correct orientation of the data matrix barcodes. The orientation for other data matrix barcodes is fixed based on the identified detected orientation of the barcode in order to scan for other data matrixes. The scanning direction is then adjusted based on the AGV movements. Subsequently, the fixed orientation is updated with respect to the turn of the AGV. In this way, the AGV dynamically scans the direction control of the AGV and navigates through the course to reach the destination storage B.

Figure 4:
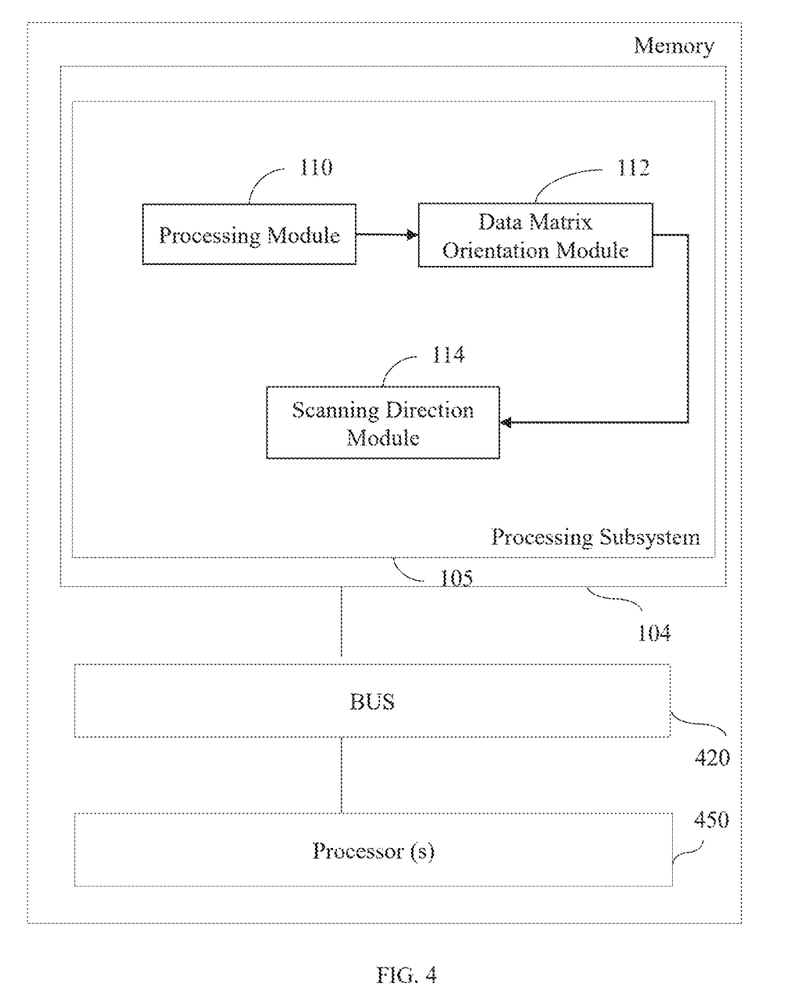
FIG. 4 is a block diagram of a computer or a server in accordance with an embodiment of the present disclosure.

FIG. 4 is a block diagram of a computer or a server in accordance with an embodiment of the present disclosure. The processing subsystem 105 is operatively coupled to a processor(s) 450, and memory 104 operatively coupled to the bus 420. The processor(s) 450, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 104 includes several subsystems stored in the form of executable program which instructs the processor 450 to perform the method steps illustrated in FIG. 1. The memory 104 includes a processing subsystem 105 of FIG. 1. The processing subsystem 105 further has following modules: a processing module 110, a data matrix orientation module 112 and a scanning direction module 114.

The processing module 110 is configured to identify a position of a data matrix symbol embedded in an image of a first barcode through a symbol localization technique via a camera attached at a bottom portion of an automated guided vehicle. The processing module 110 is configured to identify a plurality of solid sides of the data matrix symbol to define a rectangular area that accommodates the first barcode, wherein the plurality of solid sides of the data matrix are identified with a minimum number of transitions. Further, the processing module 110 is configured to scan the first barcode to detect all directions to ascertain the pattern of the barcode on a surface, wherein the scanning is performed upon initialization of the automated guided vehicle positioned in an orientation on the surface, without a pre-determined orientation of the barcode pattern affixed to the surface. Furthermore, the processing module 110 is configured to assume and streamline the identification of the data matrix barcode, wherein the data matrix barcode is predetermined for optimizing the identification of the second solid side of the data matrix barcode. Moreover, the processing module 110 is configured to confirm the identified first solid side of the first barcode and consecutive barcodes based on a plurality of factors. The data matrix orientation module 112 is operatively coupled with a processing module 110 and configured to fix a scanning direction of the automated guided vehicle for the consecutive data matrix barcodes based on the identified orientation of the first barcode for reducing runtime of the processing module required for identifying orientation of the first solid side and the second solid side. The scanning direction module 114 is operatively coupled with the data matrix orientation module 112 and configured to adjust the scanning direction based on automated guided vehicle movements in real-time. The scanning direction module 114 is also configured to update scanning process based on the movement of the automated guided vehicle.

The bus 420 as used herein refers to be internal memory channels or computer network that is used to connect computer components and transfer data between them. The bus 420 includes a serial bus or a parallel bus, wherein the serial bus transmits data in bit-serial format and the parallel bus transmits data across multiple wires. The bus 420 as used herein, may include but not limited to, a system bus, an internal bus, an external bus, an expansion bus, a frontside bus, a backside bus and the like.

Figure 5:
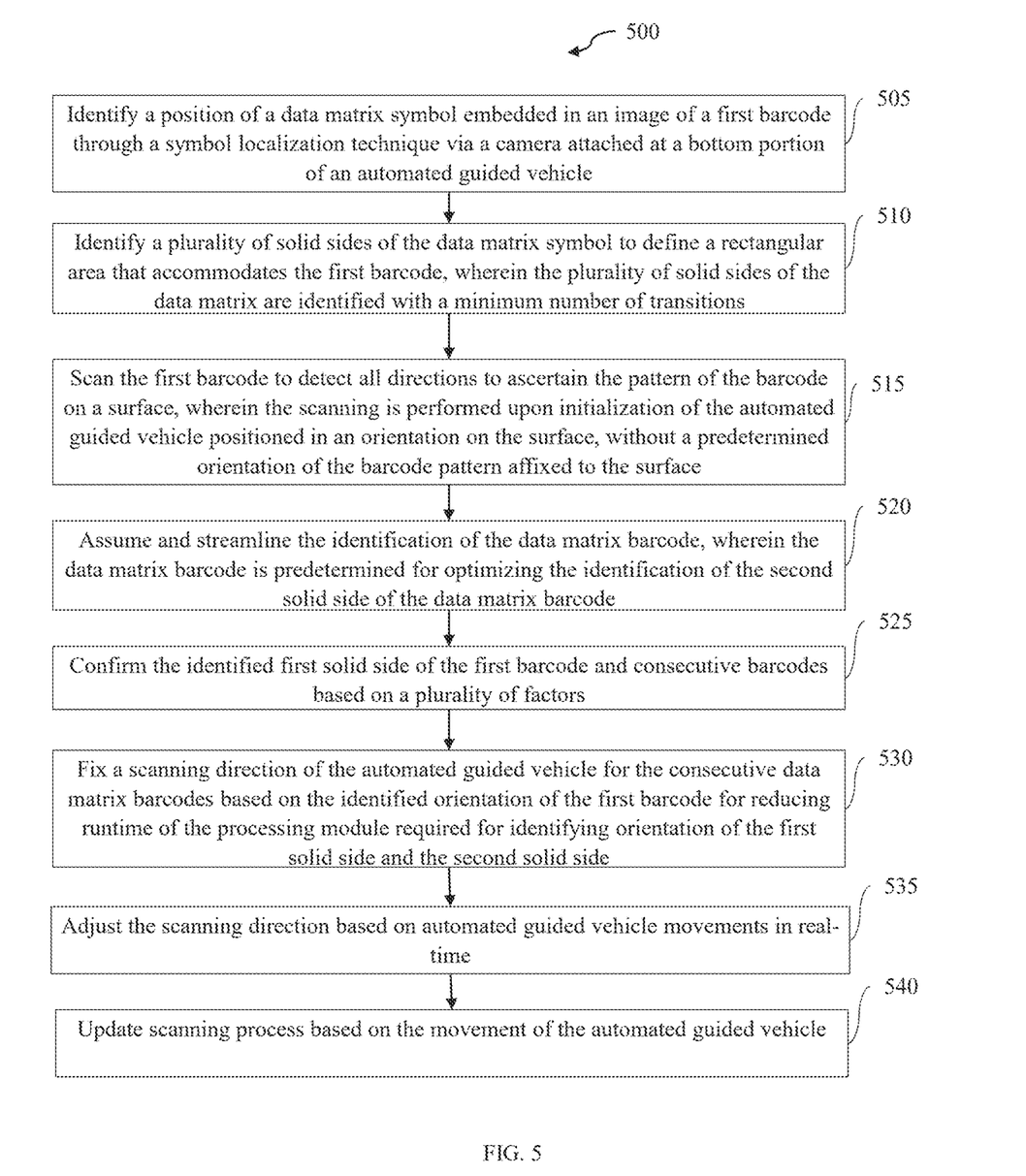
FIG. 5 is a flow chart representing steps involved in a method for dynamic scan direction control of an automated guided vehicle based on barcode information in accordance with an embodiment of the present disclosure.

FIG. 5 is a flow chart representing steps involved in a method for dynamic scan direction control of an automated guided vehicle based on barcode information in accordance with an embodiment of the present disclosure. The method begins at step 505.

At step 505, a position of a data matrix symbol embedded in an image of a first barcode is identified through a symbol localization technique via a camera attached at a bottom portion of an automated guided vehicle, by a processing module. The automated guided vehicle is equipped with a barcode scanner capable of reading the barcodes.

In one embodiment, the barcode of the plurality of barcode includes an event marker adapted to generate a plurality of control signals with respect to movement of the automated guided vehicle.

In one embodiment, the barcode information is interpreted to determine a scan direction for navigation of the automated guided vehicles.

At step 510, a plurality of solid sides of the data matrix symbol is identified to define a rectangular area that accommodates the first barcode, wherein the plurality of solid sides of the data matrix are identified with a minimum number of transitions, by the processing module. The transitions are a plurality of changes between black and white modules in the barcode. In one embodiment, the number of transitions along each of the plurality of edges is calculated by analyzing pixel values stepwise to identify solid side.

At step 515, the first barcode is scanned to detect all directions to ascertain the pattern of the barcode on a surface, by the processing module. The scanning is performed upon initialization of the automated guided vehicle positioned in an orientation on the surface, without a predetermined orientation of the barcode pattern affixed to the surface.

At step 520, the identification of the data matrix barcode is assumed and streamlined by the processing module. The data matrix barcode is predetermined for optimizing the identification of the second solid side of the data matrix barcode.

At step 525, the identified first solid side of the first barcode and consecutive barcodes are confirmed based on a plurality of factors by the processing module. In one embodiment, the plurality of factors includes symmetry geometric properties of the data matrix.

At step 530, a scanning direction of the automated guided vehicle is fixed for the consecutive data matrix barcodes based on the identified orientation of the first barcode for reducing runtime of the processing module required for identifying orientation of the first solid side and the second solid side.

At step 535, the scanning direction is adjusted based on automated guided vehicle movements in real-time by a scanning direction module. In one embodiment, a barcode decoding algorithm is enabled to dynamically adjust the scanning direction for decoding the data matrix barcode within the image captured by the camera, by the scanning direction module.

In one embodiment, the automated guided vehicle is ensured that scanning is in the accurate direction, contributing to minimize barcode decoding and rapid decision-making of movement, by the scanning direction module.

In one embodiment, ensure that the processing subsystem running in the hardware processor is responsible for decoding the barcode captured by the camera and dynamically adjusts the scanning direction.

In another embodiment, the barcode decoding is expedited, and a swift decision-making is allowed regarding the automated guided vehicle's movement.

In yet another embodiment, the automated guided vehicle is allowed to turn for minimizing the decoding time for the automated guided vehicle.

At step 540, the scanning process is updated based on the movement of the automated guided vehicle, by the scanning direction module. In one embodiment, the movement of the AGV includes a left turn and right turn.

The method ends at step 540.

Various embodiments of the present disclosure provides a system for dynamic scan direction control of an automated guided vehicle based on barcode information described above enhances AGV navigation by dynamically adjusting the scan direction based on barcode information. By utilizing the barcode information and adjusting scan directions dynamically, the system optimizes its movement to improve the speed. The system intelligently interprets barcode information to determine the appropriate scan direction (left or right) for efficient navigation. This functionality enhances the agility, speed, and accuracy of AGV movements within warehouse or industrial environments, ultimately contributing to enhanced operational efficiency and productivity. By synchronizing the scan direction with changes in the AGV's course, this technology significantly enhances decoding speed and allows the AGV to make informed decisions rapidly.

Further, different directions of the barcode are scanned to identify the side with minimal transitions thereby ensuring accuracy in recognizing the second solid side. This approach is essential for achieving fast, robust and reliable decoding results through zebra crossing (ZXing) barcode scanning library.

Furthermore, the present disclosure provides a system that is primarily used in automated logistics and warehousing, where AGV plays a vital role in efficiently moving and managing goods. The functionality of optimizing the AGV movement and item retrieval by intelligently interpreting barcodes to determine the most efficient scan directions, enhances agility and productivity of the AGV thereby streamlining operations with industrial environments.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A system for dynamic scan direction control of an automated guided vehicle based on barcode information comprising:
   a plurality of barcode strips disposed on a flat surface, wherein the plurality of barcode strips comprises a plurality of data matrix barcodes with a pre-determined pattern;
   a hardware processor;
   a memory operatively coupled to the hardware processor and the plurality of barcode strips, wherein the memory comprises a set of instructions in the form of a processing subsystem, configured to be executed by the hardware processor, wherein the processing subsystem is configured to execute on a plurality of modules wherein the plurality of modules comprises:
   a processing module configured to:
      identify a position of a data matrix symbol embedded in an image of a first barcode through a symbol localization technique via a camera attached at a bottom portion of an automated guided vehicle;
      identify a plurality of solid sides of the data matrix symbol to define a rectangular area that accommodates the first barcode, wherein the plurality of solid sides of the data matrix are identified with a minimum number of transitions;
      scan the first barcode to detect all directions to ascertain the pattern of the barcode on a surface, wherein the scanning is performed upon initialization of the automated guided vehicle positioned in an orientation on the surface, without a predetermined orientation of the barcode pattern affixed to the surface;
      assume and streamline the identification of the data matrix barcode, wherein the data matrix barcode is predetermined for optimizing the identification of the second solid side of the data matrix barcode; and confirm the identified first solid side of the first barcode and consecutive barcodes based on a plurality of factors;

a data matrix orientation module operatively coupled with a processing module, wherein the data matrix orientation module is configured to:

fix a scanning direction of the automated guided vehicle for the consecutive data matrix barcodes based on the identified orientation of the first barcode for reducing runtime of the processing module required for identifying orientation of the first solid side and the second solid side;

a scanning direction module operatively coupled with the data matrix orientation module, wherein the scanning direction module is configured to:

adjust the scanning direction based on automated guided vehicle movements in real-time; and update scanning process based on the movement of the automated guided vehicle.

2. The system of claim 1, wherein the transitions are a plurality of changes between black and white modules in the barcode.

3. The system of claim 1, wherein the rectangular area is defined by identifying a plurality of corners of the data matrix symbol.

4. The system of claim 1, wherein the processing module is configured to calculate the number of transitions along each of the plurality of edges by analyzing pixel values stepwise to identify solid side.

5. The system of claim 1, wherein the plurality of factors comprises symmetry geometric properties of the data matrix.

6. The system of claim 1, wherein the direction of movement of the automated guided vehicle is at least one of left and right.

7. The system of claim 1, wherein the scanning direction module enables a barcode decoding algorithm to dynamically adjust the scanning direction for decoding the data matrix barcode within the image captured by the camera, and wherein the dynamic control is configured to:

ensure the automated guided vehicle is scanning in the accurate direction, contributing to minimize barcode decoding and rapid decision-making of movement;

ensure that the processing subsystem running in the hardware processor is responsible for decoding the barcode captured by the camera and dynamically adjusts the scanning direction; and expedite the barcode decoding and allows a swift decision-making regarding the automated guided vehicle's movement.

8. The system of claim 1, wherein the automated guided vehicle is equipped with a barcode scanner capable of reading the barcodes.

9. The system of claim 1, wherein the scanning direction module allows the automated guided vehicle to turn minimizing the decoding time for the automated guided vehicle.

10. The system of claim 1, wherein the barcode of the plurality of barcode comprises an event marker adapted to generate a plurality of control signals with respect to movement of the automated guided vehicle.

11. A method for dynamic scan direction control of an automated guided vehicle based on barcode information comprising:

identifying, by a processing module of a processing subsystem, a position of a data matrix symbol embedded in an image of a first barcode through a symbol localization technique via a camera attached at a bottom portion of an automated guided vehicle;

identifying, by the processing module of the processing subsystem, a plurality of solid sides of the data matrix symbol to define a rectangular area that accommodates the first barcode, wherein the plurality of solid sides of the data matrix are identified with a minimum number of transitions;

scanning, by the processing module of the processing subsystem, the first barcode to detect all directions to ascertain the pattern of the barcode on a surface, wherein the scanning is performed upon initialization of the automated guided vehicle positioned in an orientation on the surface, without a predetermined orientation of the barcode pattern affixed to the surface;

assuming and streamlining, by the processing module of the processing subsystem, the identification of the data matrix barcode, wherein the data matrix barcode is predetermined for optimizing the identification of the second solid side of the data matrix barcode;

confirming, by the processing module of the processing subsystem, the identified first solid side of the first barcode and consecutive barcodes based on a plurality of factors;

fixing, by a data matrix orientation module of the processing subsystem, a scanning direction of the automated guided vehicle for the consecutive data matrix barcodes based on the identified orientation of the first barcode for reducing runtime of the processing module required for identifying orientation of the first solid side and the second solid side;

adjusting, by a scanning direction module of the processing subsystem, the scanning direction based on automated guided vehicle movements in real-time; and updating, by the scanning direction module of the processing subsystem, scanning process based on the movement of the automated guided vehicle.

12. The method of claim 11, comprises interpreting the barcode information to determine a scan direction for navigation of the automated guided vehicles.

13. A non-transitory computer-readable medium storing a computer program that, when executed by a processor, causes the processor to perform method for providing a navigation system for automated guided vehicles, wherein the method comprises:

identifying, by a processing module of a processing subsystem, a position of a data matrix symbol embedded in an image of a first barcode through a symbol localization technique via a camera attached at a bottom portion of an automated guided vehicle;

identifying, by the processing module of the processing subsystem, a plurality of solid sides of the data matrix symbol to define a rectangular area that accommodates the first barcode, wherein the plurality of solid sides of the data matrix are identified with a minimum number of transitions;

scanning, by the processing module of the processing subsystem, the first barcode to detect all directions to ascertain the pattern of the barcode on a surface, wherein the scanning is performed upon initialization of the automated guided vehicle positioned in an orientation on the surface, without a predetermined orientation of the barcode pattern affixed to the surface;

assuming and streamlining, by the processing module of the processing subsystem, the identification of the data matrix barcode, wherein the data matrix barcode is predetermined for optimizing the identification of the second solid side of the data matrix barcode;

confirming, by the processing module of the processing subsystem, the identified first solid side of the first barcode and consecutive barcodes based on a plurality of factors;

fixing, by a data matrix orientation module of the processing subsystem, a scanning direction of the automated guided vehicle for the consecutive data matrix barcodes based on the identified orientation of the first barcode for reducing runtime of the processing module required for identifying orientation of the first solid side and the second solid side;

adjusting, by a scanning direction module of the processing subsystem, the scanning direction based on automated guided vehicle movements in real-time; and updating, by the scanning direction module of the processing subsystem, scanning process based on the movement of the automated guided vehicle.

\* \* \* \* \*